Figure 1:
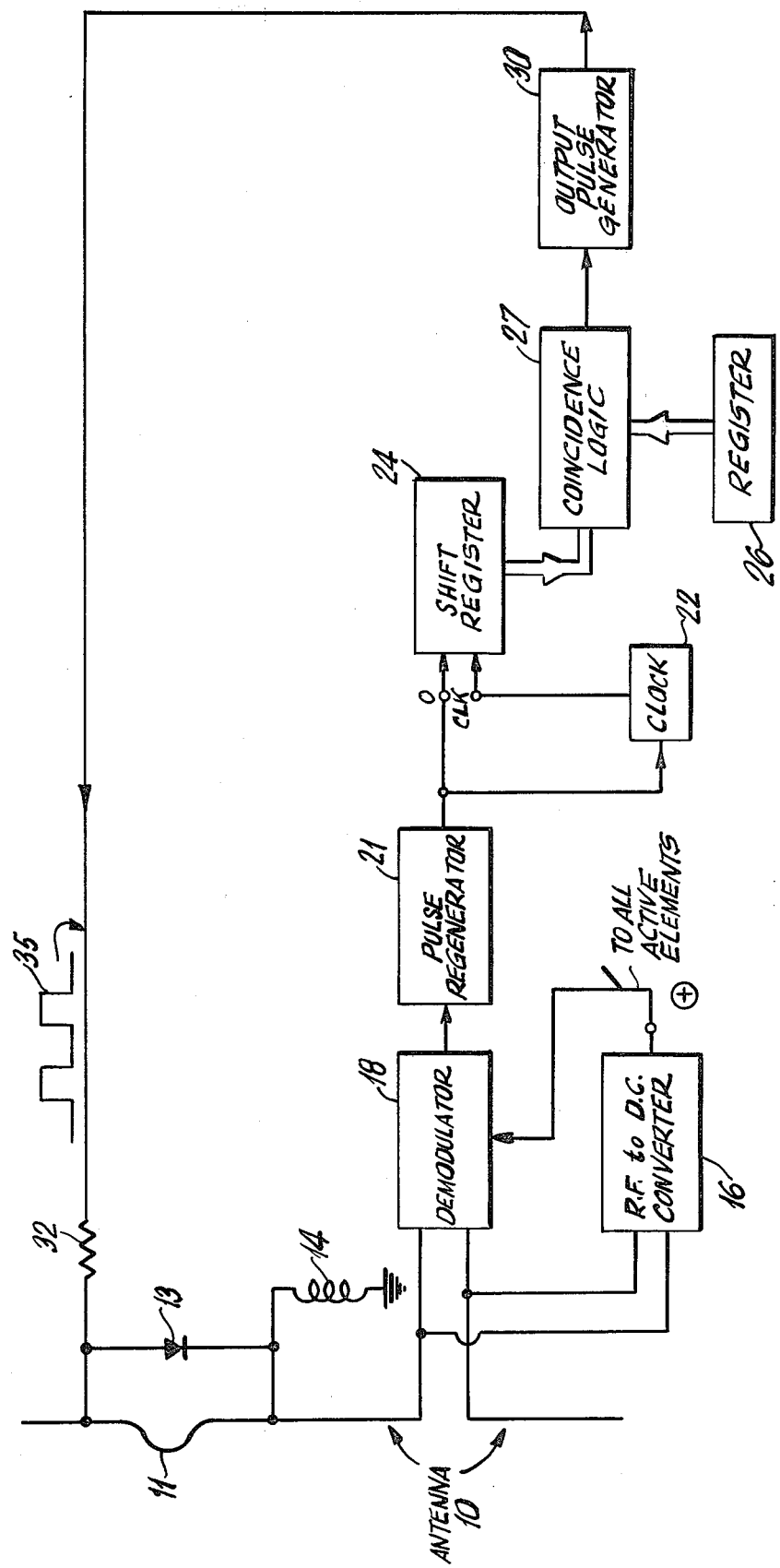

United States Patent [19]

Slobodin

[11] 4,242,663
[45] Dec. 30, 1980

[54] ELECTRONIC IDENTIFICATION SYSTEM
[75] Inventor: Leo Slobodin, Holmdel, N.J.
[73] Assignee: Lockheed Electronics Corporation, Plainfield, N.J.
[21] Appl. No.: 8,798
[22] Filed: Feb. 1, 1979
[51] Int. Cl.³ .......................... H04Q 9/00; G01S 9/56
[52] U.S. Cl. .......................... 340/152 T; 343/6.5 SS; 340/568
[58] Field of Search .............. 340/152 T, 568; 325/31, 325/45, 8; 343/6.5 SS

[56] References Cited
U.S. PATENT DOCUMENTS

| | | | |
|---|---|---|---|
| 3,754,250 | 8/1973 | Bruner | 340/152 T |
| 3,914,762 | 10/1975 | Klensch | 343/6.5 SS |
| 3,967,202 | 6/1976 | Batz | 340/152 T |
| 3,984,835 | 10/1976 | Kaplan et al. | 343/6.5 SS |
| 4,001,822 | 1/1977 | Sterzer | 343/6.5 SS |

Primary Examiner—Donald J. Yusko
Attorney, Agent, or Firm—Hopgood, Calimafde, Kalil, Blaustein & Lieberman

[57] ABSTRACT

An electronic identification system includes common transceiver and signal processing apparatus, and relative small electronic circuitry, referred to as a "tag", secured to each item of a population to be identified. Each tag is assigned a multi-bit digital code which may or may not be unique.

The common equipment determines whether any desired tag-bearing item is nearby by emitting a phase modulated radio frequency wave embodying the requisite tag code, and examining the output of a homodyne mixer, operating on a radar-like recovered reflection signal, for a predetermined signatory response. Such a response will be generated only by a tag circuit responding to a match between its stored encoding and that of the interrogation signal by changing the effective cross sectional reflecting area of the tag antenna.

13 Claims, 2 Drawing Figures (TAG)

ELECTRONIC IDENTIFICATION SYSTEM

DISCLOSURE OF INVENTION

This invention relates to electronic identification/tagging circuitry and, more specifically, to cooperative electronic apparatus for selectively detecting the incidence of any of an ensemble of marked or tagged elements.

It is an object of the present invention to provide an improved electronic identification system.

More specifically, it is an object of the present invention to provide an improved cooperative electronic identification system in which the incidence of any element of a population bearing an electronic inquiry sensing and responding circuit ("tag") may be sensed by central polling equipment. Such cooperative sensing is desired, for example, to identify tagged equipment, vehicles or other rolling stock, packages/mail, merchandise, or the like and please see below.

The above and other objects of the present invention are realized in a specific, illustrative electronic identification system including common transceiver and signal processing apparatus, and relative small electronic circuitry, referred to as a "tag", secured to each item to be identified. Each tag is assigned a multi-bit digital code which may or may not be unique.

The common equipment determines whether any desired item is nearby (i.e., within effective range) by emitting a phase modulated radio frequency wave bearing the requisite tag code, and examining the output of a homodyne mixer treating a recovered reflection wave for a predetermined characteristic response. Such a response will be generated only by a tag circuit responding to a match between its stored encoding and that of the interrogation signal by changing the effective cross sectional reflecting area of the tag antenna.

Figure 2:
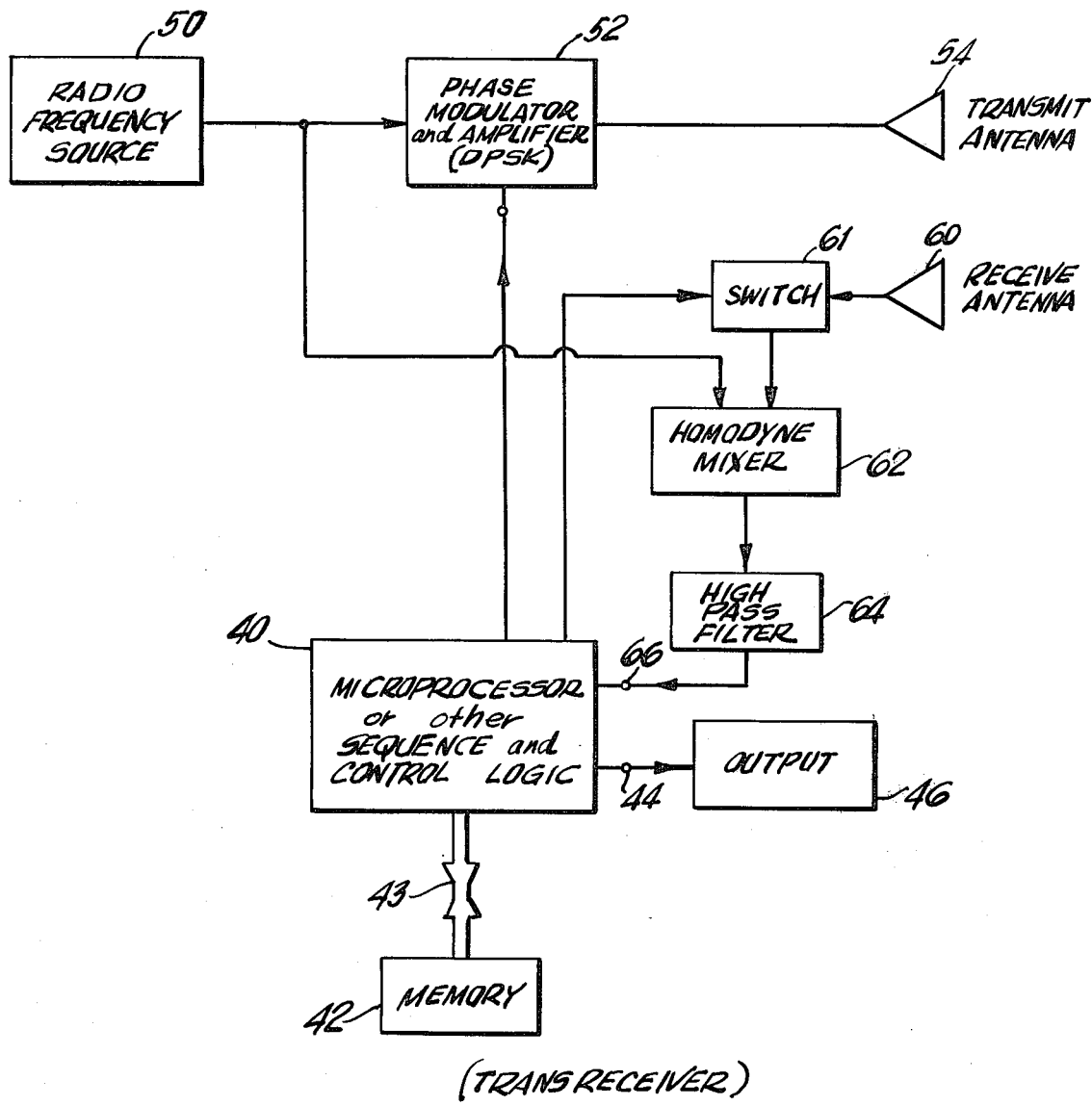

The above and other features and advantages of the present invention will become more clear from the following detailed presentation of a specific, illustrative embodiment thereof, presented hereinbelow in conjunction with the accompanying drawing, in which:

FIG. 1 is a schematic block diagram of "tag" circuitry secured to differing elements to be identified by the subject electronic identification system; and FIG. 2 is a block diagram of common, transceiver apparatus employed in the instant invention.

As above noted, the instant invention is directed to an electronic identification system which employs common transceiver equipment (FIG. 2) in a cooperative system to seek the incidence in a proximate location of a desired "tag" circuit secured to any form of apparatus, equipment, or goods to be marked. The applications of electronic identification systems are many and virtually open-ended. Thus, for example, vehicles, freight cars, packages or the like passing a point at which the common equipment is located may be interrogated for identity for traffic study or equipment location purposes; locally available material in an assembly (e.g., battlefield) situation may be measured; garments or other goods may be tagged and their presence noted at store exits for theft control; among a virtual plethora of such applications.

To implement the subject electronic identification system, the FIG. 1 tag circuit includes an antenna 10, e.g., a simple dipole of electrical length determined by the emitted interrogation wave frequency, supplying its output to a demodulator 18 and also to a radio frequency-to-D.C. tag power supply converter 16. The antenna 10 includes a portion 11 of its electrical length having a diode 13 connected thereacross. The diode 13 normally has no D.C. energization therethrough and is thus effectively not present across the antenna portion 11. The composite antenna 10 thus has an effective electrical length which includes the section 11. However, when the composite FIG. 1 tag detects a common equipment polling inquiry corresponding to its stored code, an output pulse generator 30 supplies two output pulses each of which biases on the diode 13 through a series current limiting resistor 32 and a radio frequency choke inductance 14. During each of these two pulses (the wave 35 shown in FIG. 1), the conducting diode 13 short circuits the antenna 10 portion 11, thus changing (shortening) its effective electrical length and thereby also varying (in either direction as desired) its effective reflective cross sectional area.

In overview and as more fully described below, the FIG. 2 common equipment issues a tag-seeking interrogation wave which generates a reflection at the antenna 10, which reflection is recovered at a receiving antenna 60. The amplitude of that reflection changes when the electrical length of the antenna 10 changes (responsive to output pulses from pulse generator 30). Accordingly, the tag detecting mechanism of the instant invention comprises the receiver sensing the requisite two perturbations (of predetermined duration and spacing for noise rejection) in the strength of the received reflection signal.

The interrogation wave includes the code of a tag whose incidence/absence is to be determined within the effective range of the FIG. 2 transceiver. If the output of the receiver receive antenna 60 contains the requisite two perturbations, each of predetermined width and spaced a predetermined distance apart in time, this signals that the item to be located is indeed in the proximity of the FIG. 2 common equipment.

It will be assumed that the FIG. 2 common equipment emits via a transmit antenna 54 a continuous wave which is phase (and not amplitude) modulated with a digital word corresponding to the code of a particular equipment item in the population of tagged apparatus. The incoming wave is received at the antenna 10 of FIG. 1 and passes to the radio frequency-to-D.C. converter 16 which generates an output potential (as by simple rectification) which becomes the energy source for all of the active elements of the FIG. 1 tag. In tag circuits for larger apparatus, the converter 16 may be replaced or supplemented by an additional energy source, such as a battery. Phase modulation is advantageously employed for the instant invention since the carrier wave is always present at full strength to optimize the energy available at the output of the converter 16. Differential phase shift keying (DPSK) is a desirable modulation type for transmission of tag number encoding, the transmitter radiating a reference phase between code transmission bursts.

The incoming wave serially modulated with the code word of an equipment item to be located passes to a demodulator 18 which recovers the digital modulation code word, the digital output of the demodulator 18 being regenerated in a pulse regenerator 21. The output of pulse regenerator 21 is supplied to the data input of a shift register 24. The code modulation on the incoming word is advantageously of the embedded clock (e.g., mandatory bit position transition) type, the embedded clock being recovered in a clock recovery circuit 22 which clocks the incoming data into and through the shift register 24.

The particular code assigned to the subject tag of FIG. 1 is stored in a code register 26. In its most elemental form such as for conventional current sinking logic, the register 26 may simply comprise the presence or absence of a short circuit connection path to ground.

The received modulation word stored in shift register 24 and the identity of the subject tag stored in register 26 are examined for a match, e.g., by examining the contents of the shift register 24 and register 26 on a bit-by-bit basis in coincidence (e.g., AND) logic 27. The logic circuit 27 supplies an output if, and only if, a complete identity obtains between the contents of the two registers 24 and 26. The logic circuit 27 may simply comprise plural negated Exclusive OR gates each having inputs connected to corresponding stages of registers 24 and 26 and outputs connected as inputs to the AND gate.

Assuming that the interrogation wave last emitted by the common equipment of FIG. 2 contained modulation corresponding to the contents of the register 26, the logic circuit 27 is fully enabled and signals the output pulse generator 30 to emit the two pulse output wave 35. The output pulse generator may simply comprise two cascaded monostable multi vibrators or other timing circuits having their output pulses connected to resistor 32 via disjunctive (e.g., OR) logic. As above discussed, each of the two output pulses from generator 30 causes a current of value principally determined by resistor 32 to flow through the diode 13 and radio frequency choke inductance 14, thereby biasing the diode on and short circuiting (at radio frequency) the antenna 10 section 11, thus changing the antenna reflective properties.

To summarize, and again as above noted, the effective reflective cross section of the antenna 10 thus departs from its quiescent value for the period of the two pulses of wave 35 if, and only if, the interrogation wave from the common equipment bears a digital modulation corresponding to the identity of the subject tag as stored in register 26.

The equipment 24, 26 and 27 for detecting a match between an incoming digital word and a stored identity word represents only one of the per se known circuit implementations for such purposes. As one other alternative example, the incoming wave at the output of pulse regenerator 21 can be examined on a bit-by-bit serial basis in an Exclusive OR logic gate which also receives as an input the contents of register 26 loaded into and then serially clocked out of a shift register. Reflection will show that no binary "1" is produced at the Exclusive OR gate output during an incoming word only if all bits are the same for the stored and the incoming digital word. It will also be apparent that framing fields, parity bits or the like may be included if desired as is per se known for digital communications.

Turning now to the FIG. 2 transceiver circuit, there is included a radio frequency carrier source 50 supplying its output to a phase modulator and amplifier 52, e.g., of the differential phase shift keying type as above noted. The modulation intelligence into the phase modulator 52 is supplied by a transceiver control element 40, e.g., a microprocessor or other sequencing and control logic element all per se well known. Again, the modulation intelligence is the code of a particular item whose presence or absence in the effective field of the transceiver is to be determined. The selectively phase modulated carrier from element 52 then passes for outgoing radiation to the transmit antenna 54. Between intervals when a particular outgoing polling cycle is being effected by the FIG. 2 transceiver, the continuous wave carrier supplied by source 50 is emitted by antenna 54 at a reference, unmodulated phase.

The reflection signal is recovered at the transceiver receive antenna 60, and passes through a transmit code cycle blanking switch 61 to a homodyne mixer 62. The switch 61 is enabled by the microprocessor 40 at all times other than when phase modulation is being effected to the outgoing wave. The homodyne mixer 62 compares (mixes, or hetrodynes) the emitted radio frequency wave present at the output of source 50 thereof with the recovered signal. The resultant output (zero order difference beat) of the homodyne mixer 62 is a substantially zero frequency (D.C.) signal if no change has occurred in the effective electrical length of any tag antenna 10 in the field of the transceiver. Conversely, the output of the homodyne mixer 62 has a relatively high frequency (vis-a-vis the normally obtaining zero frequency signal) component if, in fact, the effective cross sectional area of a tag antenna has changed in the manner discussed above with respect to the FIG. 1 illustrative tag.

Such a high frequency signal if present passes through a high pass filter 64 to the microprocessor or other control element 40 to signal that a tag containing the code supplied by the microprocessor 40 to phase modulator 52 is present in the transceiver field. This positive return signal may be communicated to an attendant at the common equipment (or other) station in any well known manner, e.g., by employing the output signal from filter 64 to illuminate a display by energizing a light emitting diode or other audio/visual indicator. Alternatively, some form of output display printing or other recording device 46 may be employed to record the specific code or identity of the element determined to have been in the proximity of the FIG. 2 equipment.

The FIG. 2 equipment may be employed in the manner above described to locate one specific piece of equipment or a single equipment item at a time entering that code (manually or otherwise as via a console thumb wheel electrically encoded switch array) into composite control apparatus 40. Alternatively, all possible codes of tagged equipment may be stored in a memory 42, the contents of which may be read out seriation on a word by word basis by the microprocessor or control logic 40 via a bus 43. In this manner at electrical data processing rates a large number of polling cycles, each examining for a different tag number, may be effected while a moving vehicle, mail or the like passes by a polling or sorting station, or in other applications where the common equipment is examining for a number of possible elements in the tag population in a relatively short period of time.

The above described arrangement is merely illustrative of the principles of the present invention. Numerous modifications and adaptations thereof will be readily apparent to those skilled in the art without departing from the spirit and scope of the present invention.

What is claimed is:

1. In combination in electronic identification apparatus, transceiver means including means for emitting a carrier modulated with a digital word, means for recovering a reflected signal of like frequency, and means for processing said recovered like frequency signal to determine the incidence of a tag-signalling amplitude variation therein, and at least one tag circuit means, said tag circuit means including an antenna, register means for storing a tag encoding, demodulator means connected to said antenna for recovering said modulated digital word, controlled means for selectively varying the electrical length of said antenna comprising selectively conductive means connected in parallel with a section of said antenna, and means connected to said demodulator means and said register means responsive to a match between the incoming demodulated digital word and the encoding contents of said register means for signalling said control means to vary said antenna electrical length comprising means for turning on said selectively conductive means responsive to the output of said match responsive means.

2. A combination as in claim 1 wherein said at least one tag circuit means includes a power supply comprising a sinusoid-to-D.C. converter connected to said antenna.

3. A combination as in claim 2 wherein said carrier modulation comprises phase modulation.

4. A combination as in claim 1 wherein said selectively conductive means comprises a diode, and resistive means connecting said diode with the output of said match responsive means.

5. A combination as in claim 1 wherein said match responsive means comprises a shift register connected to the output of said demodulator, and coincidence logic means having inputs connected to the outputs of said register means and said shift register means.

6. A combination as in claim 5 wherein said match responsive means further comprises plural output pulse producing means having an input connected to said coincidence logic means.

7. A combination as in claim 1 wherein said recovered signal processing means comprises homodyne mixer means.

8. A combination as in claim 1 wherein said transceiver means further comprises sequence and control logic means.

9. A combination as in claim 1 wherein said modulated carrier emitting means comprises a radio frequency carrier source, a transmit antenna, and a phase modulator connecting said carrier source and said transmit antenna.

10. A combination as in claim 9 wherein said recovered signal processing means includes a receive antenna, and homodyne mixer means having inputs connected to said receive antenna and to said radio frequency carrier source.

11. A combination as in claim 10 further comprising a microprocessor for receiving the output of said homodyne mixer means and for supplying modulation intelligence to said phase modulator.

12. A combination as in claim 11 further comprising memory means connected to said microprocessor.

13. A combination as in claim 12 further comprising output means connected to said microprocessor.

* * * * *